W. E. SANDERS.
LIQUID MEASURING TANK.
APPLICATION FILED AUG. 25, 1917.
1,273,103.
Patented July 16, 1918.
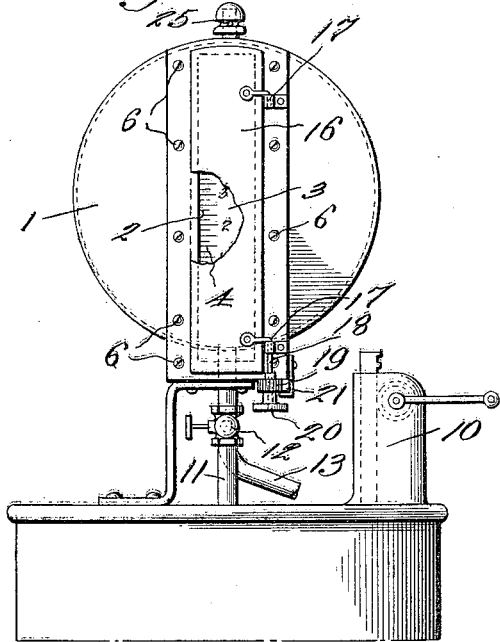
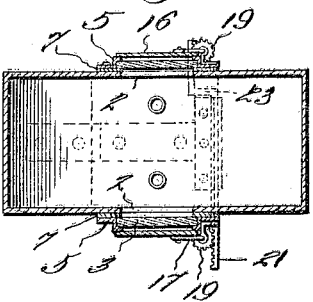
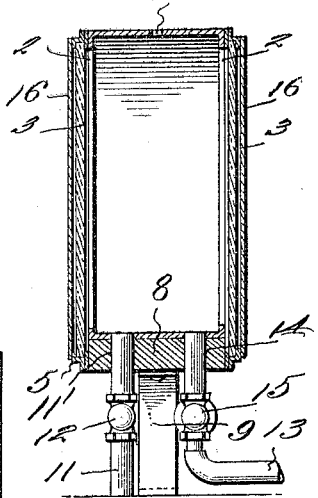
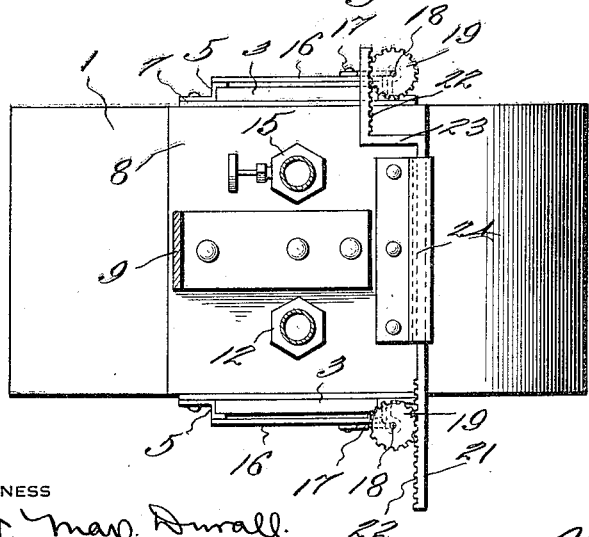
INVENTOR
W. E. Sanders
BY Victor J. Evans
ATTORNEY
WITNESS

UNITED STATES PATENT OFFICE.

WILLIAM E. SANDERS, OF WATERTOWN, NEW YORK.

LIQUID-MEASURING TANK.

1,273,103.  Specification of Letters Patent.  Patented July 16, 1918.

Application filed August 25, 1917. Serial No. 188,123.

*To all whom it may concern:*

Be it known that I, WILLIAM E. SANDERS, a citizen of the United States, residing at Watertown, in the county of Jefferson and State of New York, have invented new and useful Improvements in Liquid-Measuring Tanks, of which the following is a specification.

This invention is an improved liquid measuring tank, especially adapted for use in connection with a pump for measuring and dispensing gasolene and the like, the object of the invention being to provide an improved measuring tank of this character, the contents and the indicating scale of which are visible so that the purchaser can observe the operation of the tank and be assured that he is getting full measure.

The invention consists in the construction, combination and arrangement of devices hereinafter described and claimed.

In the accompanying drawings:—

Figure 1 is an elevation of a liquid measuring tank constructed and arranged in accordance with my invention.

Fig. 2 is a horizontal sectional view of the same.

Fig. 3 is an inverted plan of the same, partly in section.

Fig. 4 is a detailed sectional view.

The tank 1 which may be made of any suitable capacity is here shown as cylindrical and is provided in its end walls with vertical openings 2. These openings extend clear to the lower side of the tank and are covered by glass observation strips 3 which observation strips are inscribed with measuring scales 4. The glass strips are arranged in metallic casing frames 5 which have vertical slots to display the strips and the scales thereon and said casing frames are secured on the ends or sides of the tank by means of screws 6, gaskets 7 of lead or other suitable material being interposed between the glass strips and the sides or ends of the tank to prevent leakage. The lower ends of the casing frames extend below the lower side of the tank and a base 8 is secured to the lower side of the tank and extends thereacross and is arranged and secured to and between the lower ends of the casing frames. A bracket or standard 9 is secured under the center of the base and serves to hold the tank in place on a pump, which is diagrammatically indicated at 10.

The discharge pipe 11 of the pump is connected to an intake opening 11 in the base and lower side of the tank and which intake opening is provided with a ball check valve 12. A dispensing hose 13 is connected to a discharge opening 14 in the base and lower side of the tank, the said discharge opening being provided with a gate or ball valve 15 to which the hose is attached. Hence the tank can be supplied with gasolene or other liquid by the pump, the liquid measured in the tank and the liquid after having been measured can be discharged from the tank through the dispensing hose, as will be understood. Owing to the provision of the sight openings in opposite sides or ends of the tank and the arrangement of the measuring scales thereon a purchaser can observe the operations of the measuring tank and assure himself that he is getting full measure.

The casing frames are each provided with a door 16 to close the sight openings, the doors being each hinged at one side as at 17 and being arranged for simultaneous movement. The lower end of the pintle rod or pivot shaft 18 of each door is provided with a segment pinion 19 which is secured thereto by a set-screw and one of said pintle rods or shafts is also provided with a hand wheel 20. A rack link 21 is provided on opposite sides with rack teeth 22 which engage opposite sides of the segment pinions, the said rack link being offset as at 23 to clear the inlet and outlet pipes and being arranged for longitudinal movement in a guide 24 which is secured to the under side of the base. Hence by turning the hand wheel the doors can be simultaneously opened or closed, as will be understood. A suitable vent 25 is at the upper side of the tank.

Having thus described my invention, I claim:

A measuring tank of the class described having sight openings at opposite sides, hinged doors to cover and uncover the sight openings and each having a pintle rod provided with a pinion, a rack link having rack teeth on opposite sides engaging opposite sides of the pinions to cause said doors to simultaneously open or close, and a guide for said rack link and in which said rack link is longitudinally movable.

In testimony whereof I affix my signature.

WILLIAM E. SANDERS.

Copies of this patent may be obtained for five cents each, by addressing the "Commissioner of Patents, Washington, D. C."